United States Patent [19]

Cohen

[11] Patent Number: 4,995,715

[45] Date of Patent: Feb. 26, 1991

[54] DIFFRACTIVE MULTIFOCAL OPTICAL DEVICE

[76] Inventor: Allen L. Cohen, 10010 Walsham Ct., Richmond, Va. 23233

[21] Appl. No.: 456,230

[22] Filed: Dec. 22, 1989

Related U.S. Application Data

[63] Continuation of Ser. No. 222,000, Jul. 20, 1988, abandoned, which is a continuation-in-part of Ser. No. 863,069, May 14, 1986.

[51] Int. Cl.$^5$ .................. G02C 7/04; G02B 27/44; G02B 3/08; A61F 2/16
[52] U.S. Cl. ............................. 351/161; 350/162.16; 350/162.22; 350/452; 351/159; 351/168; 623/6
[58] Field of Search ............. 350/452, 162.16, 162.22; 623/6; 351/161, 159, 168

[56] References Cited

U.S. PATENT DOCUMENTS

| | | | |
|---|---|---|---|
| 3,004,470 | 10/1961 | Rule | 350/452 |
| 4,162,122 | 7/1979 | Cohen | 351/161 |
| 4,210,391 | 7/1980 | Cohen | 351/161 |
| 4,338,005 | 7/1982 | Cohen | 351/161 |
| 4,340,283 | 7/1982 | Cohen | 351/161 |
| 4,637,697 | 1/1987 | Freeman | 351/161 |
| 4,641,934 | 2/1987 | Freeman | 351/159 |
| 4,642,112 | 2/1987 | Freeman | 351/161 |

FOREIGN PATENT DOCUMENTS 602918 10/1958 United Kingdom .
1154360 6/1969 United Kingdom .

OTHER PUBLICATIONS

Ziegler, J. F.; "Fabrication or Correction of Optical Lenses"; *IBM Technical Disclosure Bulletin*; vol. 12, No. 10; Mar. 1970; pp. 1753-1575.
Walsh, A., "Echelette Zone Plates for Use in Far Infrared Spectroscopy", Journal of the Optical Society of America, Mar., 1952.
Klein et al., "Multizone Bifocal Contact Lens Design", SPIE, Aug. 1986.
Tudorovskii, "An Objective with a Phase Plate", Optics & Spectroscopy, Feb., 1959.
Forst, Guntar, "Investigations into the Usability of Circular Gratings as Vision Aids", Augenoptiker, Dec. 12, 1966.
Myers, "Studies of Transmission Zone Plates", JOSA, vol. 19, 1951.
Miyamoto, "The Phase Fresnel Lens", Journal of the Optical Society of America, vol. 51, No. 1, Jan., 1961.
Waldman, "Variations of the Fresnel Zone Plate", Journal of the Optical Society of America, vol. 56, No. 2, Feb., 1966.
Horman et al., "Zone Plate Theory Based on Holography", Applied Optics, vol. 6, No. 2, Feb. 1967.
Stigliani et al., "Resolving Power of a Zone Plate", Journal of the Optical Society of America, vol. 57, No. 5, May, 1967.
Chau, H. H. M., "Zone Plates Produced Optically", Applied Optics, vol. 8, No. 6, Jun. 1969.
Jordan et al., "Kinoform Lenses", Applied Optics, vol. 9, No. 8, Aug., 1970.
Bottema, M., "Fresnel Zone-Plate Diffraction Patterns", Journal of the Optical Society of America, vol. 59, No. 12, Dec. 1969.
Young, M., "Zone Plates and Their Aberrations", Journal of the Optical Society of America, vol. 62, No. 3, Aug., 1972.
Kleinhans, W. A., "Aberrations of Curved Zone Plates and Fresnel Lenses", Applied Optics, vol. 16, No. 8, Jun. 1972.
Gomez-Reino et al., "Placas Zonales de Amplitud y Fase: Teoria y Realizacion Experimental", Optica Pura y Aplicada, vol. 10, 1977.
Vereshchagin et al., "Chromatic Properties of Profiled Zone Plates; Continuation", Opt. Spectrosc. (USSR), 47(1), Jul. 1979.
Kyuragi et al., "Higher-Order Suppressed Phase Zone Plates", Applied Optics, vol. 24, No. 8, Apr. 15, 1985.
Fincham et al., "Optics", Butterworths, London, 9th ed., 1980, pp. 72-75.

*Primary Examiner*—Scott J. Sugarman
*Attorney, Agent, or Firm*—Finnegan, Henderson, Farabow, Garrett & Dunner

[57] ABSTRACT

A diffractive multifocal optical element comprising a phase zone plate containing annular concentric zones in which the zones are spaced substantially proportional to $\sqrt{n}$, the zones possess stepped facets that introduce a discontinuity in optical path length of less than $\lambda/2$.

27 Claims, 5 Drawing Sheets

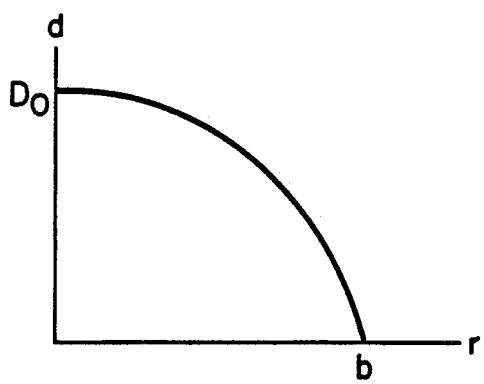
FIG. 2
(PRIOR ART)
FIG. 4
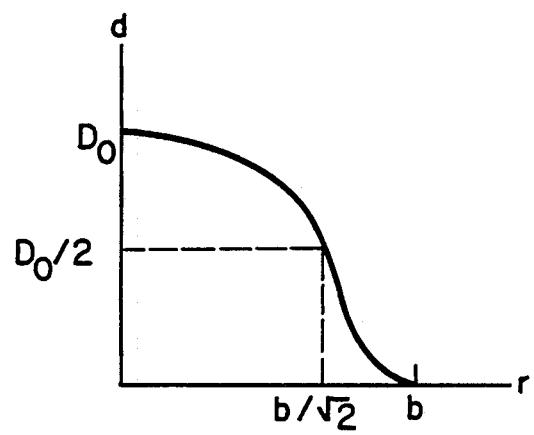
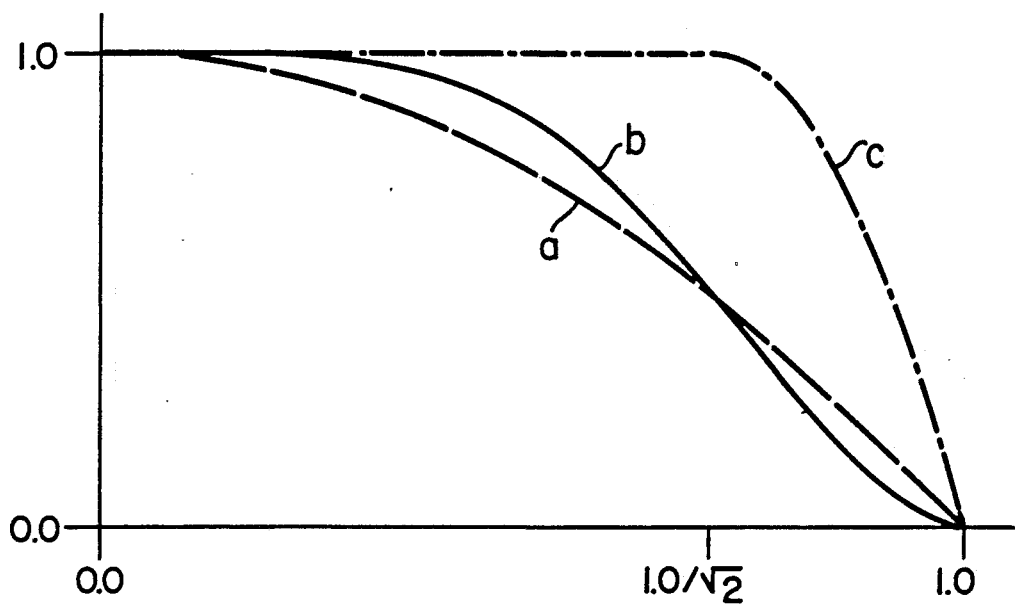
FIG. 5

DIFFRACTIVE MULTIFOCAL OPTICAL DEVICE

RELATED APPLICATIONS

This application is a continuation of application Ser. No. 07/222,000 filed July 20, 1988 now abandoned which is a continuation-in-part of commonly owned U.S. application Ser. No. 863,069, filed May 14, 1986, and is related to commonly owned U.S. application Ser. Nos. 120,265 now U.S. Pat. No. 4,881,804 and 120,262 now U.S. Pat. No. 4,881,805, both filed Nov. 12, 1987.

BRIEF DESCRIPTION OF THE INVENTION

A diffractive multifocal optical element comprising a phase zone plate containing annular concentric zones in which the zones are spaced substantially proportional to $\sqrt{n}$, the zones posses stepped facets that introduce a discontinuity in optical path length of less than $\lambda/2$. The invention also embraces a phase zone plate containing annular concentric zones possessing facets which provide an alternating stepped repetitive pattern in accordance with $\sqrt{n}$ spacing in the optical element and wherein the depth of the steps of the facets are less than $\lambda/2(\eta'-\eta)$, wherein $\eta'$ and $\eta$ are the indices of refraction of the lens and the medium in which the lens is interacting and $\lambda$ is the design wavelength.

BACKGROUND OF THE INVENTION

This invention relates to an improvement in phase zone plate optics embracing contact and intraocular lenses. A "phase zone plate", as employed herein and in the claims, is a unitary optical region of a lens utilizing the combination of a zone plate and optical facets (such as in the form of echelettes) in the zones of the zone plate, and the combined facets in the zones diffract light to produce a specific wavefront which results in a specific intensity distribution of light at a variety of orders (e.g., $0^{th}$, 1st, etc.) of the zone plate. The orders constitute the foci of the zone plate. In a restrictive sense and also in the most utilitarian sense, the phase zone plate is designed for general lens applications where the distribution of light at effective intensities is dependent upon zone spacing for yellow light. Yellow light, as employed herein, is that portion of the visible spectrum at 530–570 manometers.

This invention relates inter alias to contact lenses. Contact lenses are classical vegence type lenses. They possess a concave corneal bowl (the posterior surface) that allows fitting to the eye and the outer surface (the anterior surface) is smooth and shaped to allow the eyelid to slide over the eye and to provide proper vergence of light (taking the lens material's refractive index into consideration) to a focal point accommodating to the eye. The majority of the commercial contact lenses are shaped such that the lenses are thinnest about the optical axis and the depth of the lenses gradually increases along a sloped radial length extending in the direction of the lens perimeter. Owing to the difference in depth extending from the optical axis, light passing through the optical axis has to pass through less of the lens material. Because light travels faster in air, the light passing through greater depths relative to light passing through lesser depths will be shifted, hence be retarded in time.[1] Consequently, the shape of the lens is selected to accommodate this progressive retardation of the light so that the lightwaves emanating from the posterior surface are in synchronization in reaching a desired focal point.

[1]. See Fincham, et al., *Optics,* Published by Butterworths, London, $9^{th}$ edition, 1980, 1981, pages 72–75.

This invention concerns contact lenses utilizing phase zone plate optics, such as phase zone plate bifocal and "tuned" Fresnel lenses making use of concentric annular zones. Such lenses generally follow the designs described, for example, by Allen L. Cohen in U.S. Pat. Nos. 4,210,391; 4,338,005; and 4,340,283 ("Cohen patents"). A Cohen lens design provides that the radii "$r_n$" of the annular and concentric zones are substantially proportional to $\sqrt{n}$ and that the zones are cut so as to direct light to more than one focal point.

The Cohen lens design with phase zone plate optics allows bifocal lens constructions which are exceptionally thin. Contact lenses may be designed with phase zone plate optics in order to achieve a bifocal or other multifocal effects. The specific chromatic properties of a phase zone plate may be incorporated in the design of a contact lens including a contact lens having mutlifocal properties. All phase zone plate optical elements which are designated bifocals are possessed inherently with the ability to focus light to more than two focal points. They are designated bifocals because the intensity levels of the light to any two orders, e.g., the $0^{th}$ and $1^{st}$ order focal points are adequate for bifocal applications. In that sense, every bifocal distributes light to a third, and possibly more, focus. The judgment of whether a lens is a bifocal or trifocal is not based on any strict rule. If the wearer of the lens does not find objectionable the presence of the third or more focuses, then the lens is probably adequate as a bifocal.[2]

[2]. See Klein and Ho, *SPIE,* August 1986, Table 2 and the comments about Table 2.

Other references mentioning or suggesting phase zone plate optics in regards to contact lenses are G. Forst, "Research into the Usability of Circular Grids as Aid to Vision," Der Augenoptiker, 1966 (12), page 9–19; Ziegler, "Fabrication or Correction of Optical Lenses," as modified by Cohen, see column 4, lines 27–36 of Cohen, U.S. Pat. No. 4,339,005, and column 5, line 63 to column 6, line 68, of Cohen, U.S. Pat. No. 4,210,391; Freeman, U.S. Pat. No. 4,637,697; and Freeman, U.S. Pat. No. 4,642,112 (to the extent that holography embraces phase zone plate optics).

Bifocal contact lenses utilizing the above principles of phase zone plate optics are commerically available. Such lenses are believed to utilize stepped annular facets each comprising a full-period zone where each zone has a depth of an optical path length of $\lambda/2$ providing a physical depth of $\lambda/2(\eta'-\eta)$. $\eta'$ and $\eta$ are the indices of refraction of the lens and the medium (e.g., lachrymal layer) in which the lens is interacting and $\lambda$ is the design wavelength, in this case that of yellow light. This results in a bifocal contact lens where the $0^{th}$ and $1^{st}$ orders have an equal split of yellow light intensity at about 40.1%.

A full-period zone, for purposes of this invention, is defined as the smallest repetitive sequence of facets within a phase zone plate which are spaced substantially proportional to $\sqrt{n}$. Such spacing is characterized by the formula:

$$r_n \simeq \sqrt{2nd\lambda}$$

where d represents the 1st order focal length. A half-period zone, for the purposes of this invention, is characterized by the formula:

$$r_n \simeq \sqrt{nd\lambda}$$

where d represents the 1st order focal length.

Though the non-refractive step wall or riser to the plateau of the step is cylindrical or nearly cylindrical in the planar direction of the optical axis of the lens, and thereby occupies a small fraction of the lens phase zone plate surface area, it is regarded to be sufficiently large to contribute to a number of problems. Image shadowing and debris trapping are some of the problems that could be made less acute by reducing depth of the step wall or riser.

However, if such a lens were altered to reduce the depth of the facet[3] to a value less than $\lambda/2$, $\lambda$ being the design wavelength, the optical qualities of the lens quickly becomes very poor. Though one is dealing with very small values when working at $\lambda/2$, a few millimicrons change in dimension seriously impacts on lens performance. For example, a 10% reduction in the depth of the depth of the facets yields a significant loss of effective bifocality in such a lens. It should be appreciated that all other values relating to the phase zone plate's dimensions are commensurately small. The plateau of the facet extending from the non-refractive step to the nadir of an adjacent non-refractive step, loses thickness from the $\lambda/2$ depth to a zero depth at the nadir of the adjacent step. These facts suggest that there is little one can do to avoid the loss in bifocality when reducing the depth of the step below $\lambda/2$.

[3]. The terms "depth of a facet," "depth of the steps of the facet," "depth of the step" and words to that effect, as used herein, means in relation to the design wavelength of the lens, the degree of discontinuity in optical path length generated by the step.

It has been discovered that small changes (in some embodiments exceptionally small changes) in the configuration of the shape of inclination of the plateaus of the facets within the framework of $\sqrt{n}$ spacing provides that one can generate an effective bifocal lens based on phase zone plate optics where the depth of the step is less than $\lambda/2$. Through the alternating inclinations of facets embodied in the Cohen patents and the Cohen lens design, one can provide excellent bifocality in a contact lens where the facets have a depth less than about $\lambda/2$.

There is characterized herein a novel bifocal lens construction which provides the advantageous of $r_n$ zone spacing and stepped facets that introduce a discontinuity in optical path length of less than $\lambda/2$.

There is characterized herein a novel bifocal lens construction which reduces image shadowing attendant with conventional bifocal lenses containing stepped facets having a depth greater or equal to $\lambda/2$.

There is characterized herein a novel bifocal contact lens having a phase zone plate which possess less volume for tear collection than a bifocal contact lens having a conventional $\lambda/2$ parabolic echelette configuration. This means that the contact lenses of the invention have less volume for the trapping of debris on the eye and between the eye and the lens.

There are lens constructions according to this invention which provide surface contact with the cornea in a manner such that facet curves of the phase zone plate tangentially touch the cornea's surface. This causes the novel lens of the invention to rest more comfortably on the eye.

There is described herein a bifocal contact lens utilizing phase zone plate optics and a facet depth less than one-half the wavelength of the designed wavelength, where the primary focal points are at two orders, such as the $0^{th}$ and $1^{st}$ orders, the $0^{th}$ and $2^{nd}$ orders, or any other combination of two orders.

SUMMARY OF THE INVENTION

The invention relates to a diffractive multifocal optical element comprising a phase zone plate containing annular concentric zones in which the zones are spaced substantially proportional to $\sqrt{n}$ and the zones possess stepped facets that introduce a discontinuity in optical path length of less than $\lambda/2$ where $\lambda$ is the design wavelength.

The invention encompasses a phase zone plate containing annular concentric zones possessing facets which provide an alternating stepped repetitive pattern in accordance with $\sqrt{n}$ spacing in the optical element and wherein the depth of the steps of the facets are less than $\lambda/2(\eta'-\eta)$, where $\eta'$ and $\eta$ are the indices of refraction of the lens and the medium in which the lens is interacting and $\lambda$ is the design wavelength.

In a particular embodiment of the invention, the optical element comprises facets within the annular concentric zones providing an alternating stepped repetitive pattern wherein:

1. the facet of one of the alternating zones has an inclined curved profile that is interrupted at the zone boundary by another curved profile providing the differently inclined curved facet of the other alternating zone,
2. the zones are spaced substantially proportional to $\sqrt{n}$,
3. the depth of the facets are less than $\lambda/2$,
4. the zones are cut so as to direct yellow light to at least two primary focal points in at least adequate intensities for visual usage at each such primary focal point, and,
5. but for the alternating pattern, the element would not have such intensity.

The invention encompasses a bifocal optical element of the Cohen lens design wherein the odd and even zones of the phase zone plate
  a. conform to $r_n \simeq \sqrt{nd\lambda}$ spacing,
  b. are contiguous and free of a non-refractive step interface at at least every other zone boundary, and leave a sloped profile at such contiguous interface,
  c. the cross-section of each odd zone has the same general profile and the cross-section of each even zone has the same general profile,
  d. the general profile of the odd zones is different from that of the even zones, and
  e. the depth of steps for the zones are less than $\lambda/2$.

Preferably, the slope profile provides a smooth transsition from zone to zone.

In another aspect, the invention encompasses a bifocal optical element of the Cohen design comprising a faceted step phase zone plate containing an alternating profile wherein:
  a. the phase zone plate conforms to $r_n \simeq \sqrt{2nd\lambda}$;
  b. the alternating profile occurs within the full-period spacing;
  c. the facets have a depth less than about $\lambda/2$;
  d. the zones are cut so as to direct yellow light to at least two primary focal points in at least adequate intensity for visual usage at each such primary focal point, and e. but for such alternating profile the zones would not have such intensity for visual usage.

In a preferred embodiment, the optical element of the invention comprises optically diffractive facets providing two different curved profiles that are joined at radii $r_n$ through transition profiles located about such radii, which transition profiles have profile curvatures that are different from said two different curved profiles whereby to form annular and concentric zones at such transition profiles which zones are spaced substantially proportional to $\sqrt{n}$ and the zones are cut so as to direct yellow light to at least two primary focal points in at least adequate intensity for visual usage at each such primary focal point, which element but for the curved profiles would not have such intensity for visual usage.

This invention relates to an ophthalmic lens such as contact and intraocular lenses containing such optical elements. In a preferred embodiment of the invention, the ophthalmic lens is a bifocal lens that splits the light to two focal points in essentially equal intensities. In a most preferred embodiment of the invention, the optical element of the lens comprises a repetitive pattern of zones having a profile embraced by the equation $$d = D_0\{\tfrac{1}{2} + \tfrac{1}{2}\cdot\cos(\pi \cdot r^2 b^2)\}$$

where d is the depth of the repetitive profile, r is the radial position of the zone, b is the radius of the 1$^{st}$ zone, and $D_0$ is the facet depth for the design wavelength.

One embodiment of the invention is directed to an ophthalmic contact lens containing at least two phase zone plates within its optic zone, at least one of which embraces the features of the aforementioned optical elements.

Another embodiment of the invention is directed to an ophthalmic contact lens having within its optic zone, (1) a phase zone plate embracing the features of the aforementioned optical elements and (2) a pure refractive portion, preferably in the form of one or more channels.

BRIEF DESCRIPTION OF THE DRAWINGS

FIG. 2 is a curve illustrating the echelette profile cut from a typical prior art diffractive bifocal optical element, such as in a lens according to Ziegler, supra. The axis labeled d represents the echelette thickness and the axis labeled r represents the radial distance along the echelette.

FIG. 4 is a curve illustrating a facet profile of one embodiment of the invention. The axis labeled d represents facet thickness and the axis labeled r represents the radial distance along the facets.

FIG. 5 compares the graphical profiles of the full-period spaced echelette zone of the prior art possessing the conventional parabolic profile and the half-period spaced facet zones containing a multi-profile interrupted structure.

DETAILS OF THE INVENTION

Figure 1:
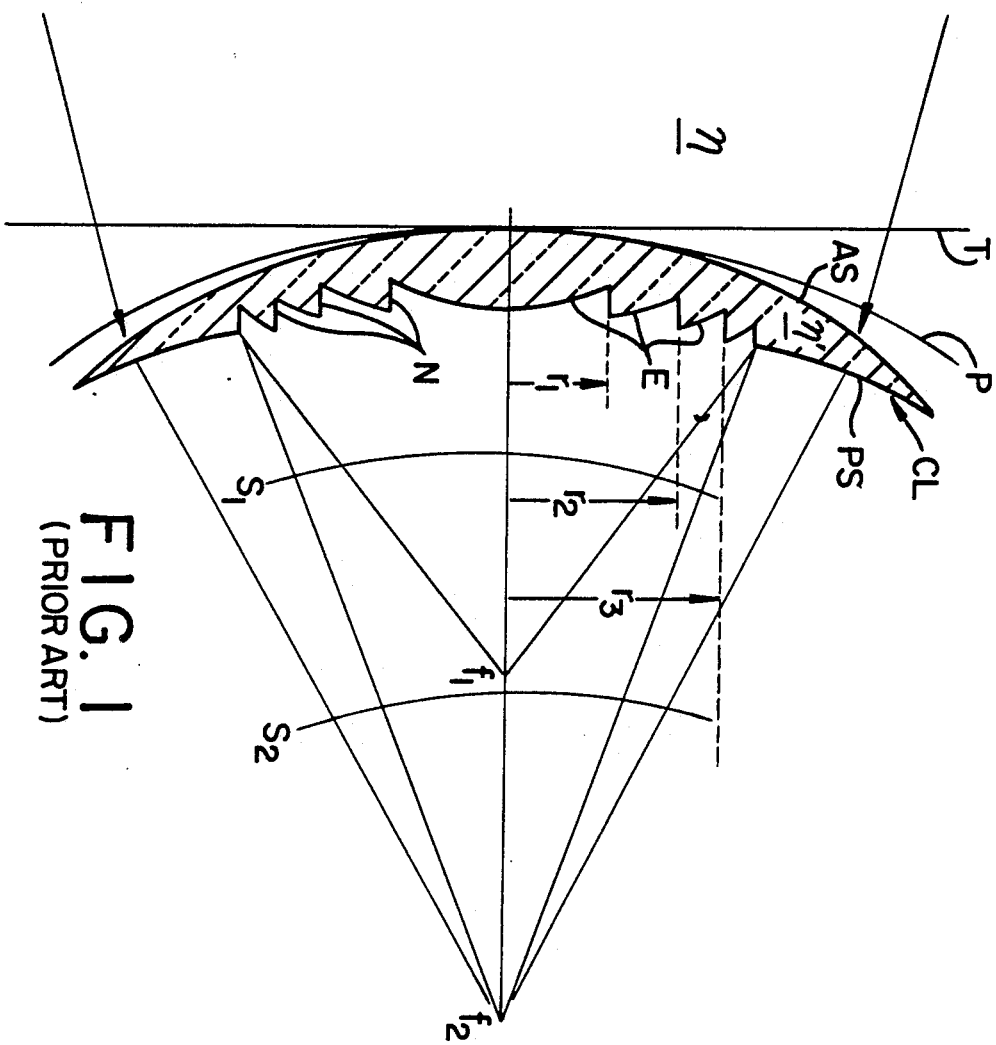
FIG. 1 illustrates an incident plane wave striking a diffractive bifocal optical element illustrating the typical parabolic shaped echelettes, have the $\sqrt{n}$ spacing pattern of the Cohen lens design, whereupon it is transformed into two (2) emergent spherical waves directed to different foci, thus depicting the general principles of multifocal diffraction.

This invention concerns inter alia bifocal optical lenses comprising an optic zone section which uses diffractive means for achieving multifocal properties. The diffractive means incorporates a repetitive pattern with shallow facet depths and a new profile. The use of a profile with shallow facet depths reduces shadowing of images, debris collection between the phase plate and the eye (in the case with contact lenses), and enhances wearer comfort in the case with contact lenses.

The invention finds its most favored employment in contact lenses. The invention involves incorporating the optical elements on the anterior or posterior portion, or both, of a contact lens. The optical elements may be provided on contact lenses by lathing or molding. The invention is favorably employed in multifocal (especially bifocal) intraocular lens.

The present invention relates to a diffraction bifocal optical element. It utilizes a circularly blazed diffraction grating to achieve its multifocal properties as taught by Cohen. The blazed grating allows for adjusting the split of light between two focal points by adjusting both the facet depth $D_0$ and the profile of the blazed facet itself. The invention utilizes novel profiles for the facets of the optical element.

The present invention relates to a diffraction bifocal optical element utilizing a circularly blazed diffraction grating to achieve its multifocal properties wherein the blazed grating allows for adjusting the split of light between two focal points by adjusting both the facet depth $D_0$ and the profile of the blazed facet itself, and the blazed facet provides an alternating inclination divided in accordance with $\sqrt{n}$ zone spacing.

The novel facet arrangements of the invention divide what in the prior art is considered a full-period ($\lambda$) spacing of the facets into alternating inclined half-period ($\lambda/2$) faceted zones that contain only one non-refractive cylindrical (or essentially cylindrical) surface for every two alternating half-period zones, and such two alternating half-period zones are interconnected by a smooth surfaced facet which effects a phase shift of the design wavelength light between the half-period zones. All of the non-refractive essentially cylindrical or cylindrical surfaces are less than $\lambda/2$ deep. The alternating zones of the invention provide control of the split of light between the focal points of the lens. By adjustment of the inclinations of the alternating zone, it is possible to vary the intensity of light to the focal points.

The invention embraces a diffraction bifocal optical element superimposed on, etched into and/or embedded within a surfaces layer of a lens possessing the ability to independently converge light to at least two (preferably two) primary focal points in which the element comprises alternating inclined half-period ($\lambda/2$) faceted zones that contain only one non-refractive cylindrical (or essentially cylindrical) surface for every two alternating half-period zones, and such two alternating half-period zones are interconnected by a smooth surfaced facet which effects a phase shift of the design wavelength light between the half-period zones. All of the non-refractive essentially cylindrical or cylindrical surfaces are less than $\lambda/2$ deep.

A remarkable aspect of the invention is the minimal difference in inclination required in the alternating facets to achieve the benefits of excellent intensity of light at the designed focal points and at the same time yield the improvements cited above, including glare and/or haloing reduction. Only a small difference in inclinations from a traditional parabolic shape is required in the half-period zones to generate a lens providing the advantages of the invention.

Such small differences come about by reason of the smallness of the facets even over a full-period zone measurement. For example, one embodiment of the invention may employ in a contact lens
where the phase plate is characterized as comprising 8 full-period zones and is located in the posterior surface of the lens,
the lens conforms to the shape of the eye and provides a typical refraction to the distant focal point, and
the design wavelength is for yellow light, about 555 nanometers,
the following dimensions:
the first zone at the optical axis has a radius of about 0.75 millimeters;
the last zone away from the optical axis has a width defined by the difference in the radius to the outer periphery of the zone and the radius to the inner periphery of the zone, of about 0.14 millimeters; and
the depth of each facet is about 0.003 millimeters.

This same structure, measured however, in terms of its 16 half-period zone spacings caused by a profile surfaces inflection occurring at a point at about $\sqrt{n}$ dimensions:
the first zone at the optical axis has a radius of 0.053 millimeters;
the last zone away from the optical axis has a width defined by the difference in the radius to the outer periphery of the zone and the radius to the inner periphery of the zone, of about 0.067 millimeters.

On comparing the optical elements comprising facets that have a conventional parabolic shape over full-period zone spacing to optical elements comprising the half-period zone spacing and facet profiles of the invention, utilizing the depth of the step of 0.003 millimeter, the half-period zone spacing is found to have a slightly lower area under the curves reflecting the profile of the facets. That difference can be as little as about 1% area difference to about 10% area difference. Typically the difference is about 2 to about 5% area difference. In the above illustration, the area difference is about 3%. As small as the area difference seems to be, its contribution to the performance of the lens is quite significant.

A lens having the prior art parabolic shaped echelettes, full-period spacing and with an echelette depth of 0.8 $\mu/2$, provides the following light intensity distribution:

| −1 | 0 | 1 |
|---|---|---|
| .05 | .57 | .25 |

That is to be compared with the Klein and Ho description of the $\lambda/2$ analog showing the following intensities:

| m = | 3. nonalternating (b = .5) |
|---|---|
| −4 | .0050 |
| −3 | .0083 |
| −2 | .0162 |
| −1 | .0450 |
| 0 | .4053 |
| 1 | .4053 |
| 2 | .0450 |
| 3 | .0162 |
| 4 | .0083 |

A slight modification in the profile while maintaining the depth of 0.8 $\lambda/2$ yields a bifocal element encompassed by the invention that provides a light intensity distribution at $0^{th}$ and $1^{st}$ orders of 0.405.

Each facet of the alternating zones of the phase zone plate has a depth less than $\lambda/2$, where $\lambda$ is the design wavelength of the phase zone plate. In those cases where one zonal facet is joined by a curved profile to another zonal facet, if only one of them is formed from a step riser representing a non-refractive surface, the two zonal facets will have a combined depth of less than $\lambda/2$. In this special case, and for convenience of calculations, the depth of the combination is viewed from the concept of full-period zone spacing. However, such alternating inclined zonal facets are viewed as having a variable depth. The depth of the facets may range from about 0.01 to about 0.99 times ($\times$) $\lambda/2$, preferably about 0.05 to about 0.95$\times\lambda/2$, most preferably about 0.1 to about 0.9$\times\lambda/2$.

Assuming arguendo it was logical to those in the art to want to reduce facet depth, until this invention, there was no reasonable way to form a diffractive bifocal with facet (echelette) depths shallower than ½ wavelength that would not adversely affect the energy split between the two emergent spherical waves.

This invention makes it possible to construct shallow facet (echelette) diffractive bifocal lenses with the requisite equal, or substantially equal, energy split between the two spherical waves going to the zeroth and first orders.

This invention supports the novel concept that the energy split between the two emergent spherical waves is determined
1. by the facet (echelette) depths and
2. the actual facet (echelette) profile.

It has been determined that by suitably contouring the facet (echelette) profiles an equal energy split is obtainable even when cutting a diffractive bifocal lens with shallow facet (echelette) depths.

With respect to FIG. 1, there is described a diffractive bifocal lens CL with a curvature to effect convergent refraction and diffraction. In the figure, optical elements E (predicated on a presumed full-period spacing) transform an incident plane wave into a wave front predominately of two spherical waves. For example, incident light wave with planar phase front P passes through the anterior surface AS of lens CL and emerges from the posterior surface PS as a light wave of predominately the two spherical phase fronts $S_1$ and $S_2$ with intensities $I_1$ and $I_2$, respectively. The posterior surface PS contains diffractive echelettes E and their corresponding non-optical edges N. The facet (echelette) spacing in a diffractive optical element is given by the standard formula $$r_n \simeq \sqrt{n} \cdot r_1$$

in which $r_n$ is the radius of the $n^{th}$ zone (utilizing full-period spacing). And $\eta$ and $\eta'$ are the refractive indices of air and the lens CL, respectively. The location of the focal points of the two spherical wavefronts is determined by the radius of the first zone $r_1$ and the carrier power of lens CL. In particular, the $n^{th}$ order focal point $f_m$ is given by the equation $$f_m = (r_1)^2/(2 \cdot \lambda \cdot m)$$

with $\lambda$ = wavelength; and m=0, ±1, ±2, etc.

A desirable energy split has been suggested to occur when the two emergent spherical waves carry equal amounts of the total energy, that is, when $I_1 = I_2$. The current literature states that this is the case when the facet (echelette) depths $D_0$ are set at ¼ wavelength deep (see the Klein and Ho, supra).

FIG. 2 depicts a standard parabolic profile used in the prior art (see Ziegler, supra). The depth d of the repetitive profile as a function of radial position r is shown in the following equation:

$$d = D_0 \cdot (1 - r^2/b^2)$$

b = radius of the 1$^{st}$ zone

This profile is repeated in each zone but scaled down proportionally to the width of each such zone. The facet (echelette) depth for an equal energy split at the 0$^{th}$ and 1$^{st}$ orders is shown by the following equation:

$$D_0 = 0.500 \cdot \lambda/(n-1)$$

n = index of refraction
and the intensity split is given by $$I_1 = I_2 = (2.0/\pi)^2 = 0.405.$$

Figure 3:
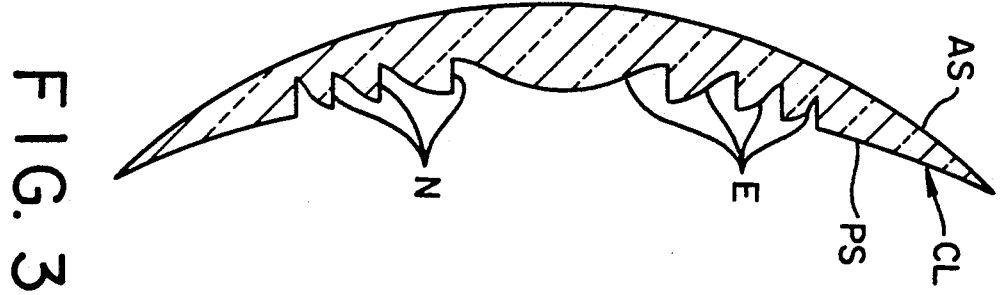
FIG. 3 is a cross-section of one embodiment of optical element in accordance with the invention, the facets of which are depicted graphically in FIG. 4.

FIG. 3 shows a diffractive bifocal optical lens containing facets according to the design illustrated in FIG. 4. The facet depths are 0.405/0.500 = 80% of the depths required by prior art lenses.

FIG. 4 illustrates a new cosine profile used in one embodiment of this invention. The repetitive profile is given by $$d = D_0 \cdot \{\tfrac{1}{2} + \tfrac{1}{2} \cdot \cos(\pi \cdot r^2/b^2)\}$$

The facet depth, utilizing a full-period spacing between the non-refractive edges of the steps but containing alternating inclined facets within half-period spacing, for an equal energy split is given by $$D_0 = 0.405 \cdot \lambda/(n-1)$$

and the intensity split is given by $$I_1 = I_2 = J_0^2(0.405 \cdot \pi) = 0.403$$

where $J_o$ is a bessel function.

FIG. 3 comprises an optical lens CL possessing anterior surface AS and peripheral posterior surface PS. In this embodiment the posterior surface of the optic zone is comprised of the diffractive facets (echelettes) E and their corresponding non-optical edges N. The physical profile of the facets (echelettes) E is given by $$d = D_0 \cdot \{\tfrac{1}{2} + \tfrac{1}{2} \cdot \cos(\pi \cdot r^2/b^2)\}$$

where d is the thickness of the facet (echelette), r is the radical distance from the inner edge of the zone (and such profile is repeated in each zone but scaled down proportionally to the width of each such zone) within which the facet (echelette) is formed and the occurrence of such profile alternation, and b is the radius of the first zone. This particular profile is drawn in FIG. 4.

FIG. 5 is an overlay of the parabolic echelette design a characteristic of the prior art (see FIG. 2), the cosine profile b of FIG. 4 and another useable profile c for a bifocal lens. The purpose of the overlay is to illustrate the profile differences between the structures of the invention and the prior art illustrated by FIG. 2. Note particularly the shift in profile of curve b at the $\sqrt{n}$ spacing. That small difference allows the profile of curve b to be suitably employable as the facet profile for the lens element of the invention.

The physical profile of the facet c is given by $$y = 1 - \{(r^2 - 1/\sqrt{2})/(1 - 1/\sqrt{2})\} \quad r > 1/\sqrt{2}$$

Profiles a and c at such reduced depth fail to give an equal intensity split of the light to the 0$^{th}$ and 1$^{st}$ orders whereas they do when $$D_0 = 0.500 \cdot \lambda/(n-1).$$

FIGS. 6 through 10 depict a variety of useful facet profiles that can be used according to the invention in the lens construction of FIG. 2.

Figure 6:
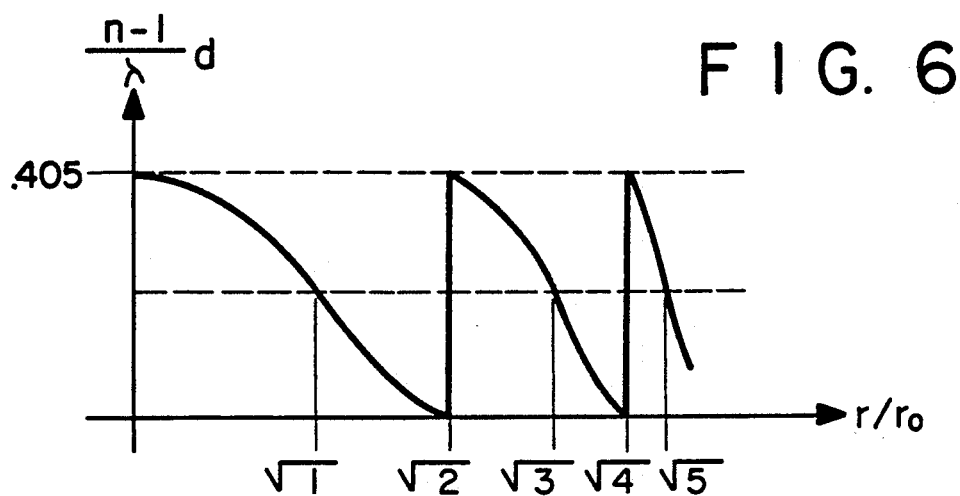
FIGS. 6 through 12 provide graphical depictions of cross-sectional views of a variety of facet arrangements for optical elements within the scope of this invention.

FIG. 6 graphically depicts along an x-y axis the profile of FIG. 4 in a repetitive sequence of alternating half-period inclined zones represented by the odd and the even zones. This particular embodiment is characterized by $$y = 0.405 \lambda/(n-1) \cdot \{\tfrac{1}{2} + \tfrac{1}{2}\cos(\pi r^2/2r_o^2)\}$$

$$I_0 = I_1 = 0.402$$

wherein $\lambda$ is the designed wavelength and n is the index of refraction of the lens medium.

Figure 7:
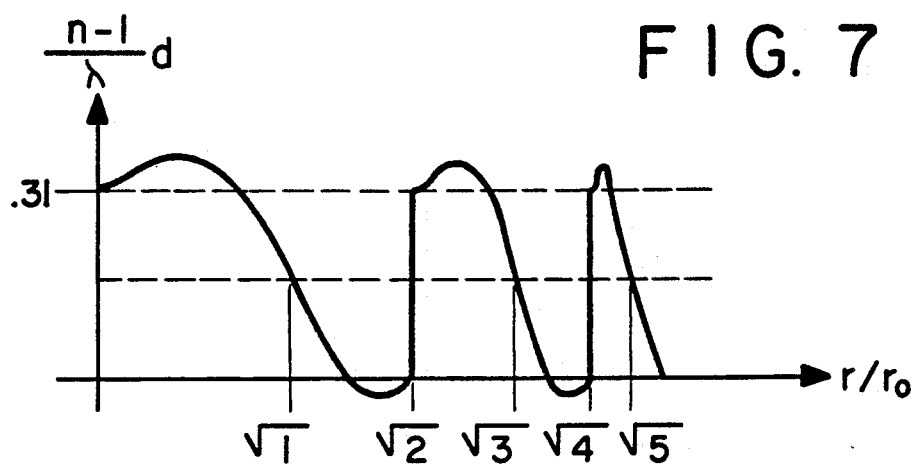

FIG. 7 is another profile graphically depicted along an x-y axis in which the depth of the non-refractive edges of the step are further reduced to 0.31$\lambda$ and the depth of the even half-period zones have a curved connection with the non-refractive edge. This embodiment of the invention is characterized by $$y = 0.314\lambda/(n-1) \cdot 2.5\{\tfrac{1}{2} + \tfrac{1}{2}\cos(\pi r^2/2r_o^2)\} - 0.314\lambda/(n-1) \cdot 1.5\{1 - r^2/2r_o^2\}$$

$$I_0 = I_1 = 0.390$$

Figure 8:
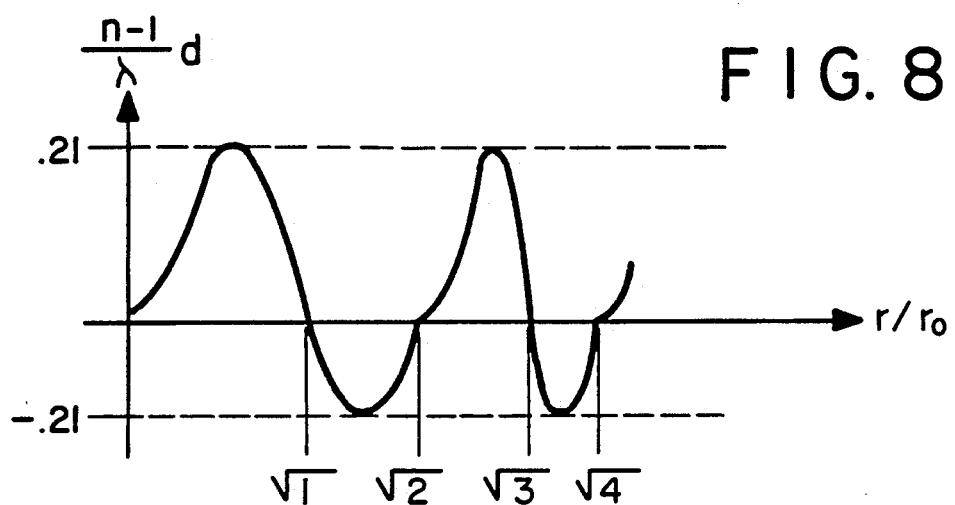

FIG. 8 shows a profile where the edge of the step is inclined, suggesting that it contributes to the optical quality of the phase zone plate. The profiles of the half-period alternating zones in this embodiment are different from the preceding designs, mainly because the non-refractive edge has been substantially removed. This embodiment is characterized by $$y = \lambda/(n-1)\{r^2/r^2 + \cos(\pi r^2/2r_0^2) - 1\}$$

$$I_0 = I_1 = 0.314$$

It is to be noted in this embodiment that the depths of the facets for the odd zones were further reduced to 0.21λ but the even zones have a depth below the nadir of the odd zones by another 0.21λ.

Figure 9:
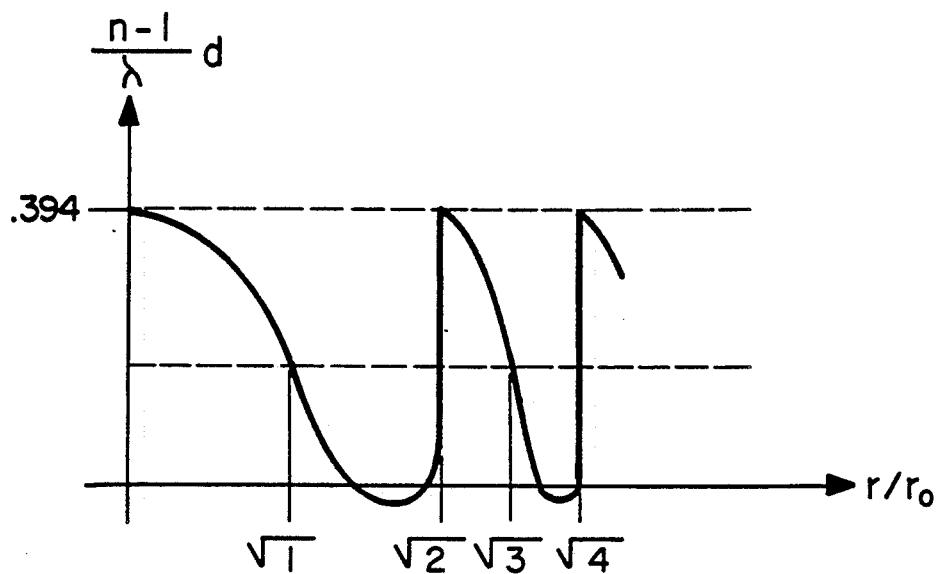

FIG. 9 shows a faceted profile where the inclination of the even zones have a bottom curvature which presents two opposite-facing curves before connecting with the non-refractive edge of the step. This embodiment of the invention is characterized by $$y = 0.394\lambda/(n-1)\{0.287 + 0.731 J_0(4.20 \cdot r^2/2r_0^2)\}$$

$$I_0 = I_1 = 0.402$$

wherein $J_0$ is a bessel function.

Figure 10:
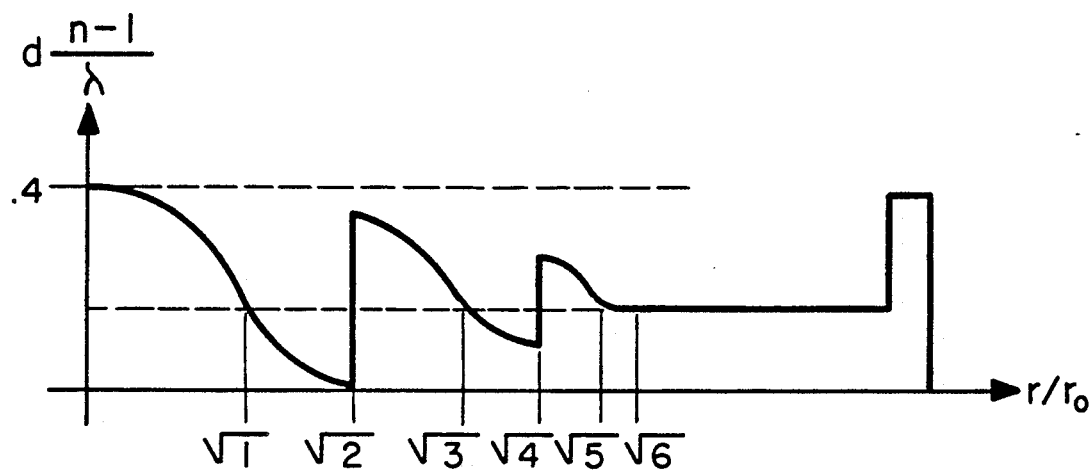

FIG. 10 shows another facet profile that incorporates two phase zone plates and a pure refractive portion. In this embodiment, there is a decrease in depth from full-period zone to full-period zone, though it is not necessary for the decrease to exist throughout the optic zone. For example, the first half of the full-period zones of the optic zone may be only one depth, and the second half of the full-period zones may be progressively reduced in depth. In the preferred modes of such embodiments, each of the steps, whether of the same or different depth, is equally divided along a common plane of the optic zone. The pure refractive portion is preferably in the form of one or more channels which may be incorporated within the optic zone and/or circumscribing the optic zone. The particular embodiment of FIG. 10 is characterized by $$y = a\lambda/(n-1) \{\tfrac{1}{2} + \tfrac{1}{2} \cos (\pi/2) \cdot (r^2/r_0^2)\}$$

where $a$ decreases from zone to zone.

Figure 11:
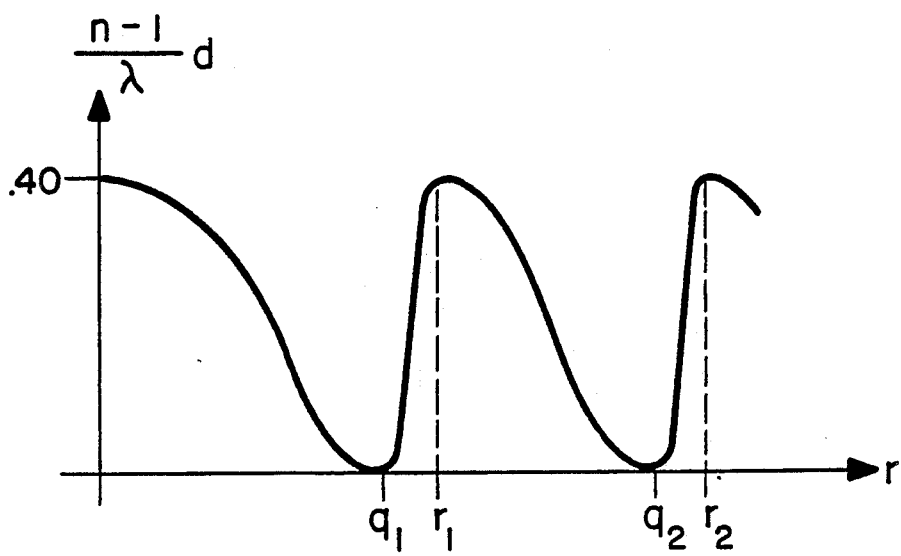
Figure 12:
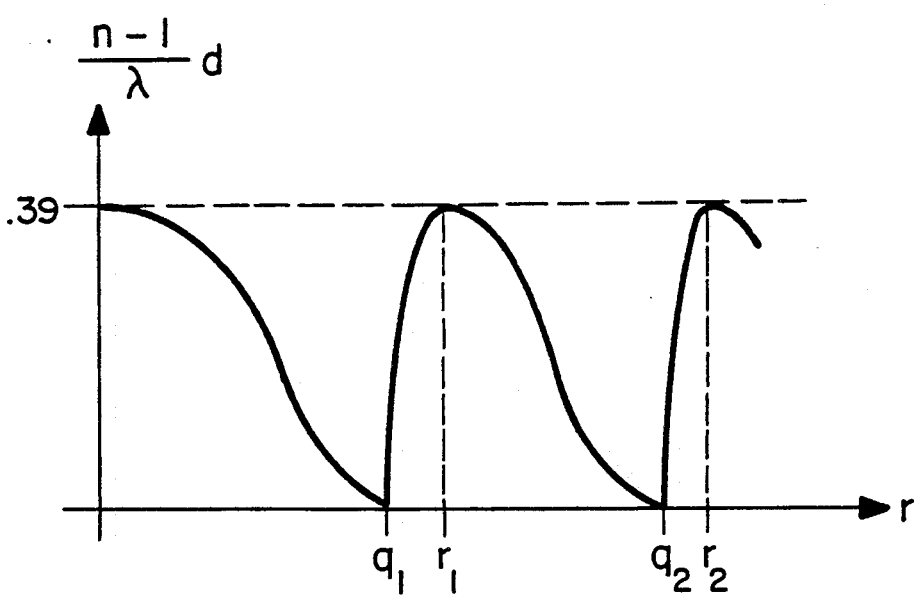

The faceted profiles of FIGS. 11 and 12 introduce a space reduction in the full period zone at $q_1$ which allows the step to proceed from $q_1$ to $r_2$, etc. This space reduction in the alternating zone is not regarded to alter the $\sqrt{n}$ spacing of the zones. FIG. 11 is characterized by $$y_n = 0.40 \{\tfrac{1}{2} + \tfrac{1}{2} \cos [(\pi/(q_n^2 - r_n^2)) \cdot (r^2 - r_{n-1}^2)]\}$$

where $r_{n-1} < r < q_n$ $$y_n = 0.40 \{\tfrac{1}{2} + \tfrac{1}{2} \sin [(\pi/(r_n^2 - q_n^2)) \cdot (r^2 - (r_n^2 + q_n^2)/2)]\}$$

where $q_n < r < r_{n-1}$ $$r_n \simeq \sqrt{2nd\lambda}$$

$$q_n^2 = r_{n-1}^2 + (r_n^2 - r_{n-1}^2/a^2)$$

$$a = 1.086$$

FIG. 12 is characterized $$y_n = 0.39 \{\tfrac{1}{2} + \tfrac{1}{2} \cos [(\pi/(q_n^2 - r_n^2)) \cdot (r^2 - r_{n-1}^2)]\}$$

where $r_{n-1} < r < q_n$ $$y_n = 0.39 \{1 - (r - r_n)^2/(r_n - q_n)^2\}$$

where $q_n < r < r_n$ $$r_n \simeq \sqrt{2nd\lambda}$$

$$q_n^2 = r_{n-1}^2 - (r_n^2 - r_{n-1}^2)/a^2.$$

$$a = 1.086$$

It should be appreciated that the invention is not limited to the exact details of construction shown and described herein for many obvious modifications will occur to persons skilled in the art. In particular, many different profiles may be determined which allow the reduction of facet (echelette) depths without changing the desirable equal energy split. However, the choice of facet profile is not dependent upon effecting an equal energy split. It is believed that the achievement of the energy splits, whether equal or not, is directly derived from the alternating inclinations of the half-period zones.

I claim:

1. A diffractive multifocal optical element comprising a phase zone plate containing a plurality of annular concentric zones which are spaced substantially proportional to $\sqrt{n}$, where n is the zone number, and each of the zones including at least one stepped facet for introducing a discontinuity in optical path length of less than λ/2, where λ is the design wavelength of the phase zone plate.

2. The diffractive multifocal optical element of claim 1 wherein the phase zone plate contains a plurality of facets which provide an alternating stepped repetitive zone pattern in accordance with $\sqrt{n}$ spacing in the optical element, where n is the zone number, and wherein the depth of steps of the facets are less than $\lambda/2(\eta' - \eta)$, where $\eta'$ and $\eta$ are the respective indices of refraction of the lens and the medium in which the lens is interacting.

3. The diffractive multifocal optical element of claim 2 wherein:
   a. the facet of one of the alternating zones has an inclined curved profile that is interrupted at the zone boundary by another curved profile providing the differently inclined curved facet of the other alternating zone,
   b. the zones are spaced substantially proportional to $\sqrt{n}$,
   c. the depth of the facets are less than λ/2, where λ is the design wavelength, and
   d. the inclined curved profile of the zones direct light of the design wavelength to at least two primary focal points in at least adequate intensities for visual usage at each such primary focal points.

4. The optical element of claim 2 wherein the repetitive pattern comprises zones having a profile embraced by the equation $$d = D_o \cdot \{\tfrac{1}{2} + \tfrac{1}{2} \cdot \cos (\pi \cdot r^2/b^2)\}$$

where d is the depth of the repetitive profile, r is the radial position of the zone, b is the radius of the 1$^{st}$ zone, and $D_o$ is the facet depth for the design wavelength.

5. The optical element of claim 1 in the form of an ophthalmic lens.

6. The optical element of claim 2 in the form of an ophthalmic lens.

7. The optical element of claim 3 in the form of an ophthalmic lens.

8. The optical element of claim 4 in the form of an ophthalmic lens.

9. The ophthalmic lens of claim 5 in the form of one of a contact lens and an intraocular lenses.

10. The ophthalmic lens of claim 6 in the form of one of a contact lens and an intraocular lenses.

11. The ophthalmic lens of claim 7 in the form of one of a contact lens and an intraocular lenses.

12. The ophthalmic lens of claim 8 in the form of one of a contact lens and an intraocular lenses.

13. An ophthalmic contact lens containing at least two phase zone plates within its optic zone, at least one of which contains the multifocal optical element of claim 1.

14. An ophthalmic contact lens having within its optic zone, (1) a phase zone plate which contains the multifocal optical element of claim 1 and (2) a pure refractive portion.

15. The diffractive multifocal optical element of claim 3, wherein light of the design wavelength is yellow light.

16. A bifocal optical element of Cohen lens design, having a phase zone plate with odd and even zones, wherein the odd and even zones of the phase plate
   a. conform to full period spacing wherein $r_n \simeq \sqrt{2\,n\,d\,\lambda}$, where r is the zone radius, n is the zone number, d is the focal length of the phase zone plate and $\lambda$ is the design wavelength of the phase zone plate,
   b. include steps between adjacent zones, the steps having a depth of an optical path length less than about $\lambda/2$, and
   c. the design wavelength and depth of step is chosen so that zones direct light of the design wavelength to at least two primary focal points in at least adequate intensity for visual usage at each such primary focal point.

17. The optical element of claim 16 in the form of an ophthalmic lens.

18. The ophthalmic lens of claim 17 in the form of one of a contact lens and an intraocular lenses.

19. The bifocal optical element of the Cohen lens design of claim 16, wherein light of the design wavelength is yellow light.

20. A bifocal optical element of Cohen lens design comprising a faceted step phase zone plate containing an alternating profile wherein:
   a. the phase zone plate includes a plurality of substantially concentric zones and conforms to $r_n \simeq \sqrt{2\,n\,d\,\lambda}$, where r is the zone radius, n is the zone number, d is the focal length of the phase zone plate and $\lambda$ is the design wavelength;
   b. the alternating profile occurs within the full-period spacing;
   c. steps are provided between adjacent zones, the steps having an optical path length of less than about $\lambda/2$; and
   d. the zones of the zone plate are formed so that the zone plate directs to direct light of the design wavelength to at least two primary focal points in at least adequate intensity for visual usage at each such primary focal point.

21. The optical element of claim 20 in the form of an ophthalmic lens.

22. The ophthalmic lens of claim 21 in the form of one of a contact lens and an intraocular lenses.

23. The bifocal optical element of the Cohen lens design of claim 20, wherein light of the design wavelength is yellow light.

24. An optical element comprising a plurality of concentric zones, each of said plurality of zones including optically diffractive facets providing two different curved profiles that are joined at radii $r_n$, where n is the zone number, through transition profiles located about such radii, which transition profiles have profile curvatures that are different from said two different curved profiles to form annular and concentric zones which zones are spaced substantially proportional to $\sqrt{n}$ and the zones direct light of the design wavelength to at least primary focal points in at least adequate intensity for visual usage at each such primary focal point.

25. The optical element of claim 24 in the form of an ophthalmic lens.

26. The ophthalmic lens of claim 25 in the form of one of a contact lens and an intraocular lenses.

27. The optical element of claim 24, wherein light of the design wavelength is yellow light.

* * * * *

UNITED STATES PATENT AND TRADEMARK OFFICE
CERTIFICATE OF CORRECTION

PATENT NO. : 4,995,715

DATED : February 26, 1991

INVENTOR(S) : Allen L. Cohen

It is certified that error appears in the above-identified patent and that said Letters Patent is hereby corrected as shown below:

Claim 16, column 13, line 27, after "of" insert -- the --.

Claim 20, column 14, line 4, after "of" insert -- the --.

Claim 20, column 14, line 8, change "$\overline{2nd\lambda}$" to -- $\sqrt{2nd\lambda}$ --.

Claim 24, column 14, line 37, change "$\sqrt[]{n}$" to -- $\sqrt{n}$ --.

Claim 24, column 14, line 39, after "least", first occurrence, insert -- two --.

Signed and Sealed this

Twenty-ninth Day of December, 1992

*Attest:*

DOUGLAS B. COMER

*Attesting Officer*     Acting Commissioner of Patents and Trademarks